United States Patent [19]

Hill

[11] Patent Number: 5,743,408
[45] Date of Patent: Apr. 28, 1998

[54] LEATHER AUTOMOBILE TRIM

[76] Inventor: Mark Langdon Hill, P.O. Box 228, Tucson, Ariz. 85702

[21] Appl. No.: 648,836

[22] Filed: May 16, 1996

[51] Int. Cl.$^6$ ............................................. B65D 69/00
[52] U.S. Cl. ............................................. 206/575; 428/40.1
[58] Field of Search ............................... 428/40.1, 41.8, 428/42.1, 221, 98; 206/223, 574, 575, 224, 457

[56] References Cited

U.S. PATENT DOCUMENTS 3,701,207  10/1972  Conrad .................................. 206/575 X
5,129,522   7/1992  Druskoczi ............................ 206/575 X

*Primary Examiner*—Jacob K. Ackun

[57] ABSTRACT

Leather accent panels for an automobile or other vehicle in which a layer of adhesive is placed onto a roughen or textured side of the leather. When this adhesive is tacky, a covering tape having an adhesive on one side thereof, is pressed onto the tacky adhesive so that a tight bond is created. In one embodiment, the adhesive component of the covering tape is a double sided adhesive tape. To assist in the placement of the panels, some embodiments of the invention utilize releasable contact points which assist in the positioning of the leather panel prior to its full adhesion to the dashboard. In another embodiment, the adhesive on the leather is heat activated and small pressure sensitive adhesives permit the leather panels to be positioned, and then the panels are heated to form the permanent bond by activating the heat-activated adhesive. In the kit form of the invention, the leather panels are packaged in their relative positions for placement onto the vehicle's dashboard. Each leather panel fits into a single pocket in the packaging and the pockets are arranged to mimic the dashboard. The pockets further contain identifiers of instructions for the placement of the leather panels.

22 Claims, 4 Drawing Sheets

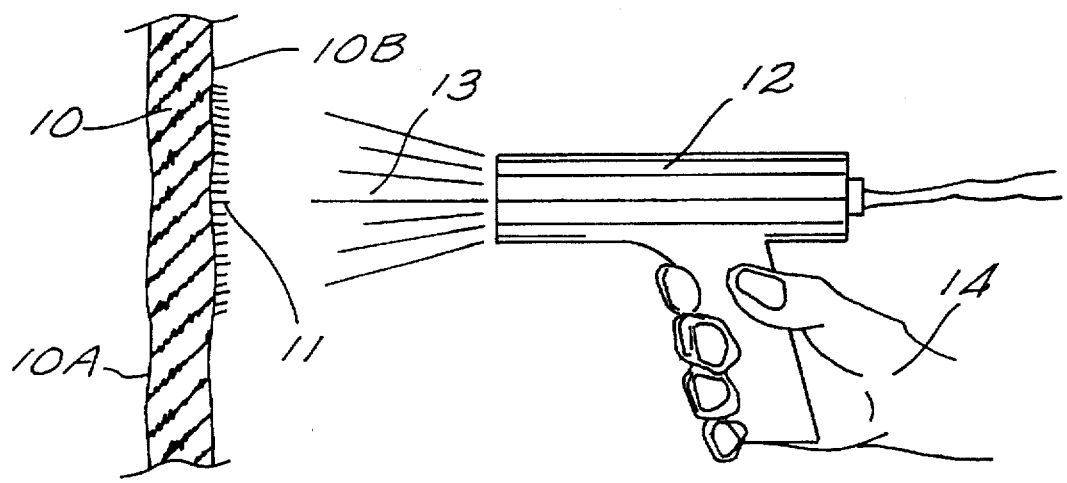
FIG. 1
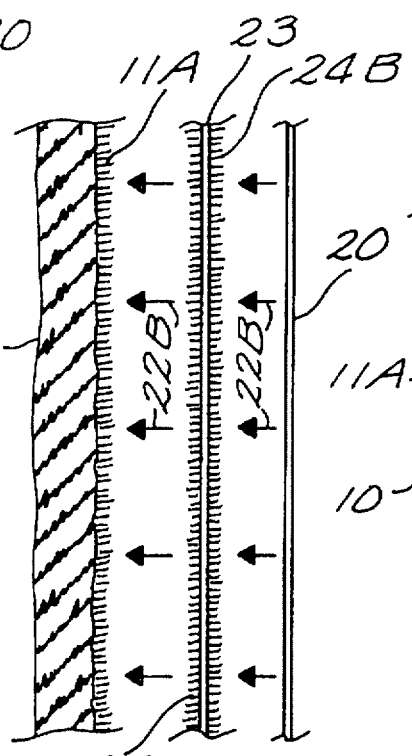
FIG. 2A
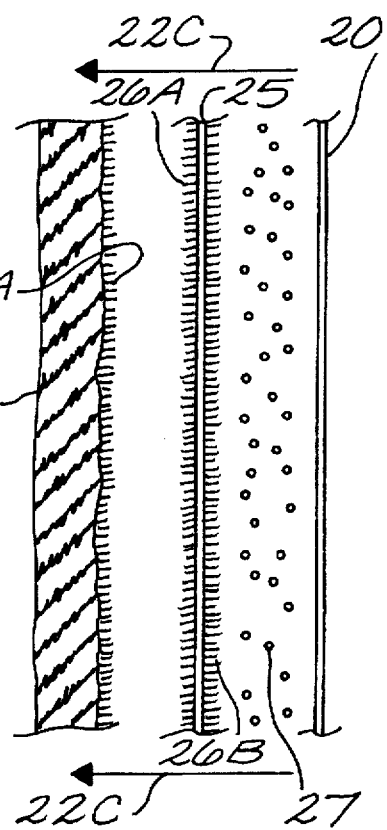
FIG. 2B
FIG. 2C

LEATHER AUTOMOBILE TRIM

BACKGROUND OF THE INVENTION

This invention relates generally to automobiles and other vehicles and more particularly to leather accent panels for such automobiles and vehicles.

The average person spends a great deal of time in their vehicle. Often the automobile becomes an extension of the personality of the driver and reflects how the driver feels about himself.

Although the basic automobile creates the general feel for the driver, often the driver desires to enhance the vehicle to give it a more luxurious feel. This is done through a variety of ways which "customize" the vehicle. Often these customizing methods though are expensive and require expert application. This is especially true for the application of leather accent pieces which are difficult and expensive to apply.

Some "customization" is simple and can be performed by the driver without the need of special tools. These added features are typically of poor quality and usually reflect badly upon the vehicle.

It is clear from the foregoing that there is a need for an effective aftermarket leather trim which can be applied by the owner of the vehicle.

SUMMARY OF THE INVENTION

Within this discussion, the leather panels will be described in relationship to their bonding to an automobile's dashboard; but, the invention is not so limited and includes any substrate which will accept leather panels for accent pieces.

Involved in the invention are leather accent panels for an automobile or other vehicle. Initially the leather is heated to a very high temperature to encourage it to shrink to close to its minimal size. In this manner, when the leather is heated by the car's natural heat when exposed to the sun, the leather panel does not shrink appreciably. This maintains the leather's attractiveness.

A layer of adhesive is placed onto a roughen or textured side of the leather. Processed leather typically has a finished smooth surface and a rough second surface. It is the finished surface which is to be exposed leaving the rough second surface to accept the adhesive for bonding to the dashboard, automobile door, or other such substrate.

A roughened surface though presents a difficult layer for the adhesive to acquire good bonding. In the present invention, this handicap is eliminated through the use of a preliminary coat of adhesive which is placed onto the rough layer. This preliminary coat of adhesive is allowed to become "tacky" before a second layer of adhesive is applied.

The tacky preliminary layer readily bonds with the second layer to form exceptional bonding therebetween.

The second layer of adhesive is accomplished in a variety of ways:

(1) a pressure sensitive adhesive is placed onto a covering tape and the tape is pressed against the tacky preliminary layer (the covering tape being removable during application to expose the pressure sensitive layer);

(2) a double sided tape having pressure adhesive placed on each side is sandwiched between the tacky preliminary layer and a covering tape (again the tape is removable during application of the leather panel); and, (3) a double sided heat activated adhesive is applied to the tacky preliminary layer, droplets of pressure adhesive are applied to the exposed side of the double sided heat activated adhesive, and a covering tape is applied over the droplets of pressure adhesive (as before, the tape is removable during application).

Those of ordinary skill in the art readily recognize other arrangements which capitalize upon the concept outlined above.

In the embodiment where pressure adhesive is placed upon a tape and the tape is pressed against the tacky preliminary layer, the choice of the pressure sensitive adhesive and the covering tape material is made to allow the covering tape to be peeled away from the leather panel to expose the pressure adhesive.

The pressure adhesive forms a tight bond between the dashboard and the leather panel. The now fully cured preliminary layer, assists in creating this bond. In this manner, the rough side of the leather panel is effectively used for the side adhering to the dashboard.

In the embodiment where a double sided adhesive tape is used, the adhesive on the sides of the tape are of the character that the overlying covering tape does not form a permanent bond but allows removal of the covering tape to expose one side of the double sided adhesive tape for application to the dashboard or other surface.

This embodiment is particularly easy to produce since the entire assembly consists of three layers which are sandwiched together. These layers are: the leather with a tacky preliminary layer of adhesive, the double sided adhesive tape, and the tape covering.

In application of either of the two above embodiments, the covering tape is removed to exposed the pressure sensitive adhesive; the leather panel is then positioned and pressed against the dashboard. The pressure that the user applies causes the leather panel to bond with the dashboard.

In the third embodiment, a different arrangement exists. The leather is still prepared with a preliminary layer of adhesive which is allowed to become tacky. In this embodiment though, a heat activated adhesive is applied to the tack preliminary layer. This heat activated adhesive is applied either directly or through a double sided taped which has been treated on both sides with heat activated adhesive.

Over the heat activated adhesive is applied a series of droplets of pressure sensitive adhesive and over this the tape covering is applied.

In this embodiment, the heat activated adhesive is bonded to the preliminary layer and the tape covering is releasable bonded to the heat activated adhesive via the droplets of pressure sensitive adhesive.

In application, the tape covering is removed, exposing the droplets of pressure sensitive adhesive. The leather panel is placed in position on the dashboard; and, since only a small amount of pressure sensitive adhesive is used, can be removed and repositioned until the proper alignment is obtained. When the user is satisfied with the result, the leather panel is heated using such techniques as a hand held heater, to create the permanent bond with the dashboard.

This embodiment is particularly useful since it allows the user to adjust the leather panel without fear of a permanent bond being created until the user is ready for the creation of the permanent bond.

Those of ordinary skill in the art readily recognize a variety of pressure sensitive and heat activated adhesives which will serve the functions outlined above.

To assist in the placement of the panels, some embodiments of the invention utilize releasable contact points which assist in the positioning of the leather panel prior to its full adhesion to the dashboard.

This is accomplished by creating "tabs" or small strips within the covering tape so that the user is able to expose a small portion of the pressure sensitive adhesive. This small portion is not sufficient to prevent the user from removing the leather panel and repositioning. When the user is satisfied with the result, the remaining tape covering is removed and the leather panel is permanently bonded to the dashboard.

In the kit form of the invention, the leather panels are packaged in their relative positions for placement onto the vehicle's dashboard. This assists the user in identifying the proper location for each leather panel.

Each leather panel fits into a single pocket in the packaging and the pockets are arranged to mimic the dashboard. The mimicry of the dashboard is preferably carried forward with the inclusion of descriptors as to the placement of the leather panel and a description of how the leather panel should be applied.

The invention, together with various embodiments thereof will be more fully explained by the accompanying drawings and the following description.

DRAWINGS IN BRIEF

FIG. 1 illustrates the preferred embodiment's application of the preliminary layer of adhesive to the rough side of the layer.

FIGS. 2A, 2B, and 2C illustrate three alternative embodiments of the invention and the formation of completed leather panels.

FIGS. 3A, 3B, and 3C illustrate a kit package containing the pre-cut leather panels, an undecorated dashboard, and a completed dashboard containing the leather panel accent pieces.

DRAWINGS IN DETAIL

Figure 3A:
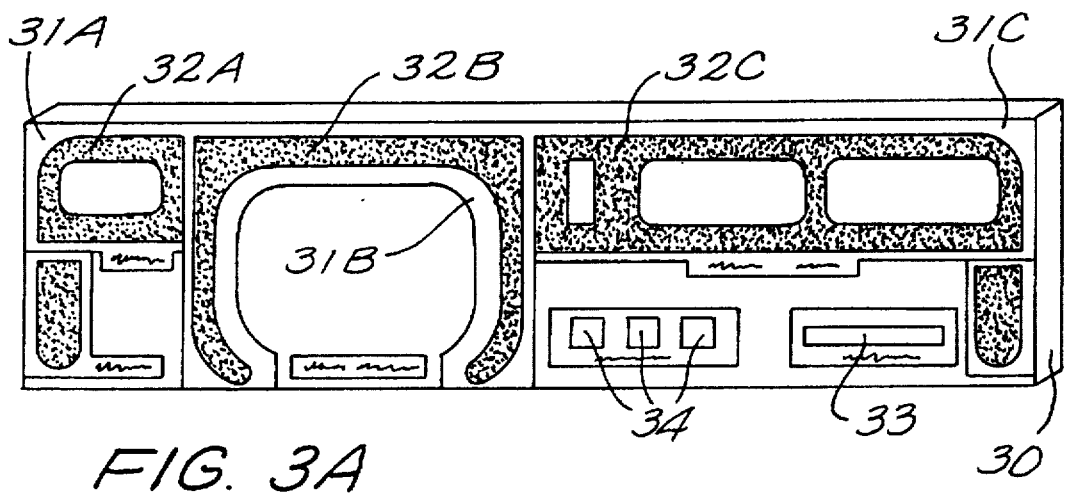

FIG. 1 illustrates the preferred embodiment's application of the preliminary layer of adhesive to the rough side of the layer.

As noted earlier, leather panel 10 has been pre-shrunk to approximate its minimal dimensions so that subsequent heating does not appreciably shrink the leather and decrease its aesthetic value.

Leather panel 10 has a generally smooth side 10A and a rough side 10B. In this embodiment, adhesive 13 is sprayed by operator 14 using gun 12. Adhesive 13 form a layer of adhesive, illustrated in this embodiment as 11. Adhesive 11 is allowed to become tacky before the next step is attempted.

FIGS. 2A, 2B, and 2C illustrate three alternative embodiments of the invention and the formation of completed leather panels.

In the first embodiment, shown in FIG. 2A, the adhesive on leather panel 10 has become tacky 11A. This embodiment presses tape covering 20, which has been treated with pressure activated adhesive 21 against the tacky preliminary adhesive 11A as indicated by arrows 22A.

Tacky preliminary adhesive 11A forms an excellent bond with adhesive 21 while allowing covering tape 20 to be released to expose adhesive 21 during application of the leather panel to the dashboard.

An alternative embodiment is shown in FIG. 2B. Again, the preliminary adhesive has become tacky 11A on leather panel 10. A double sided tape 23 having pressure activated adhesive 24A and 24B thereon. Pressure activated adhesive 24A is pressed against tacky preliminary adhesive 11A and covering tape 20 is pressed against adhesive 24B as indicated by arrows 22B.

The assembly so formed allows covering tape 20 to be removed during application of the leather panel against the dashboard.

Manufacture of this embodiment is facilitated due to the double sided tape 23 which includes the required adhesives and needs only be pressed into location.

Yet another embodiment is shown in FIG. 2C which again begins with leather panel 10 and tacky adhesive 11A. Again a double sided tape 25 is used, but, in this case, adhesives 26A and 26B are heat activated. Pressure activated droplets 27 are applied to heat activated adhesive 26B and a covering tape 20 is applied over the entire assembly which is pressed together as indicated by arrows 22C.

In this embodiment, the heat activated adhesives 26A and 26B are not activated until application, tacky adhesive 11A holds the double sided tape 25 and the pressure activated droplets 27 bond the double sided tape 25 to covering tape 20.

Once the covering tape 20 is removed and the assembly is pressed against the dashboard, droplets 27 hold the assembly in place; but, should the assembly need be adjusted, droplets 27 do not form such a bond that the user cannot move the assembly without damaging the leather.

When ready for permanent bonding, the assembly is heated which causes the heat activated layers 26A and 26B to engage and form the permanent bond with the dash (not shown).

Figure 3B:
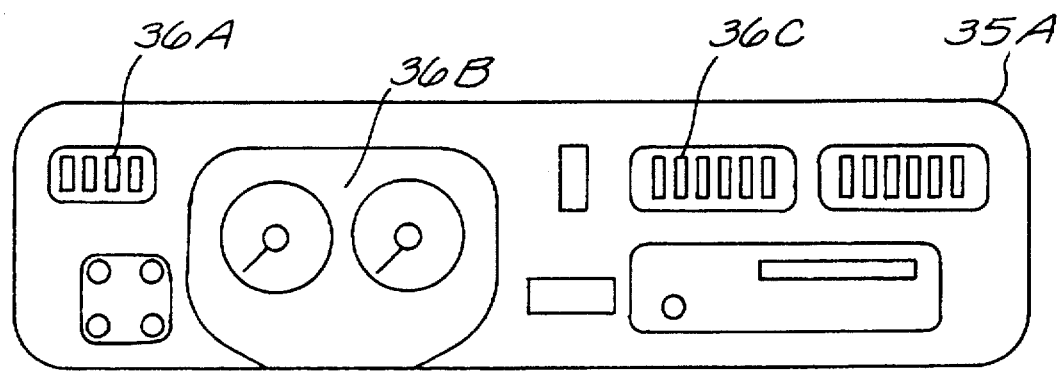
Figure 3C:
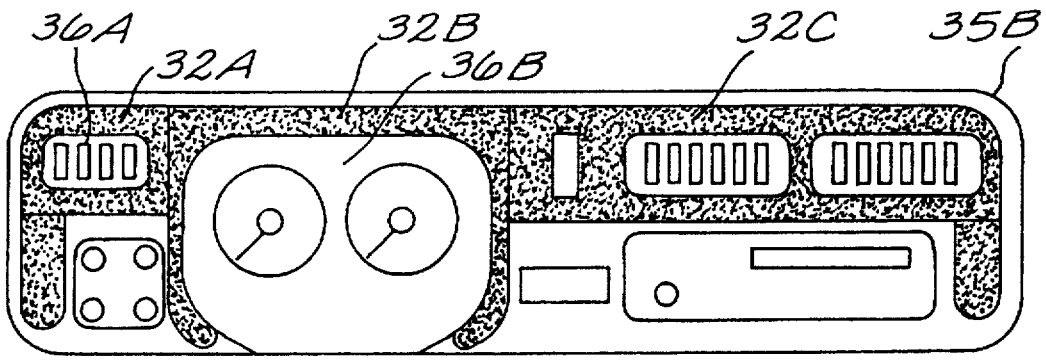

FIGS. 3A, 3B, and 3C illustrate a kit package containing the pre-cut leather panels, an undecorated dashboard, and a completed dashboard containing the leather panel accent pieces, respectively.

The kit comes in box 30 which has a grouping of pockets such as 31A, 31B, and 31C. These pockets are arranged to mimic dashboard 35A as shown in FIG. 3B. As example, leather panel 32A which is contained in pocket 31A is intended to fit around air vent 36A as shown in FIG. 3C.

In similar fashion, leather panels 32B and 32C fit around gauges 36B and vents 36C respectively and as shown in FIG. 3C.

In this manner, the user is able to visualize where each of the leather panels is to be placed onto the dashboard while the leather panels are still within the packaging.

In the preferred embodiment, each pocket includes a description of where the leather panel should be placed together with printed instructions on the placement of the panel. Further, each pocket is identified by a hierarchial reference (e.g. 1, 2, 3, etc.) to indicate the preferred order of placement of the leather panels.

Hence, a user finds pocket #1, identified as "control panel", sees its relative position for the dashboard (as indicated by the package's pocket for the control panel), and applies the leather panel as per the instruction found in pocket #1. The user repeats this for pocket #2, #3, etc. until all of the leather panels have been properly applied.

Included in the packaging is a tool 33 to assist in the placement of the leather panels together with guides 34 which are used to align the leather panels during placement.

Figure 4:
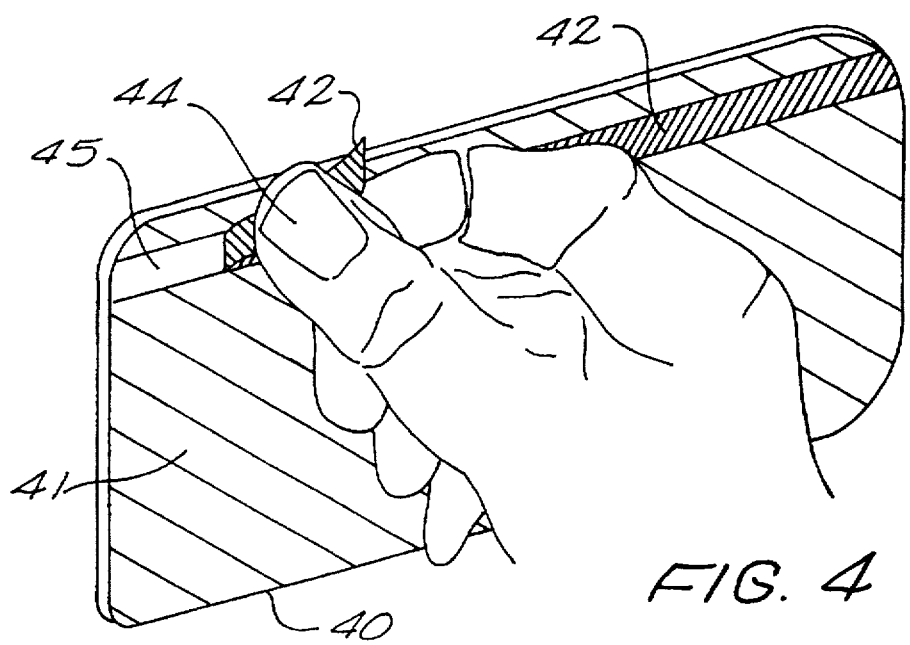
FIG. 4 shows an embodiment of the invention in which a small portion of the covering tape is removed permitting the leather panel to be temporarily placed and adjusted prior to permanent bonding.

FIG. 4 shows an embodiment of the invention in which a small portion of the covering tape is removed permitting the leather panel to be temporarily placed and adjusted prior to permanent bonding.

This embodiment of the invention assists in the placement of the leather panel. Leather panel 40 has a removable tape backing 41 which has a serrated portion 42. Serrated portion 42 is substantially smaller than the back of leather panel 40 and is easily removed by operator 44 to expose pressure sensitive adhesive 45.

In application, user 44 removes the serrated portion 42 and then places the leather panel 40 in the desired position. Should leather panel 40 not be properly positioned, then the adhesion of adhesive 45 to the dashboard is slight enough to permit the leather panel 40 to be removed and again placed.

This process can be repeated until user 44 is satisfied with the placement; then, the rest of covering tape 41 is removed while the leather panel remains in proper alignment with the dashboard.

Figure 5:
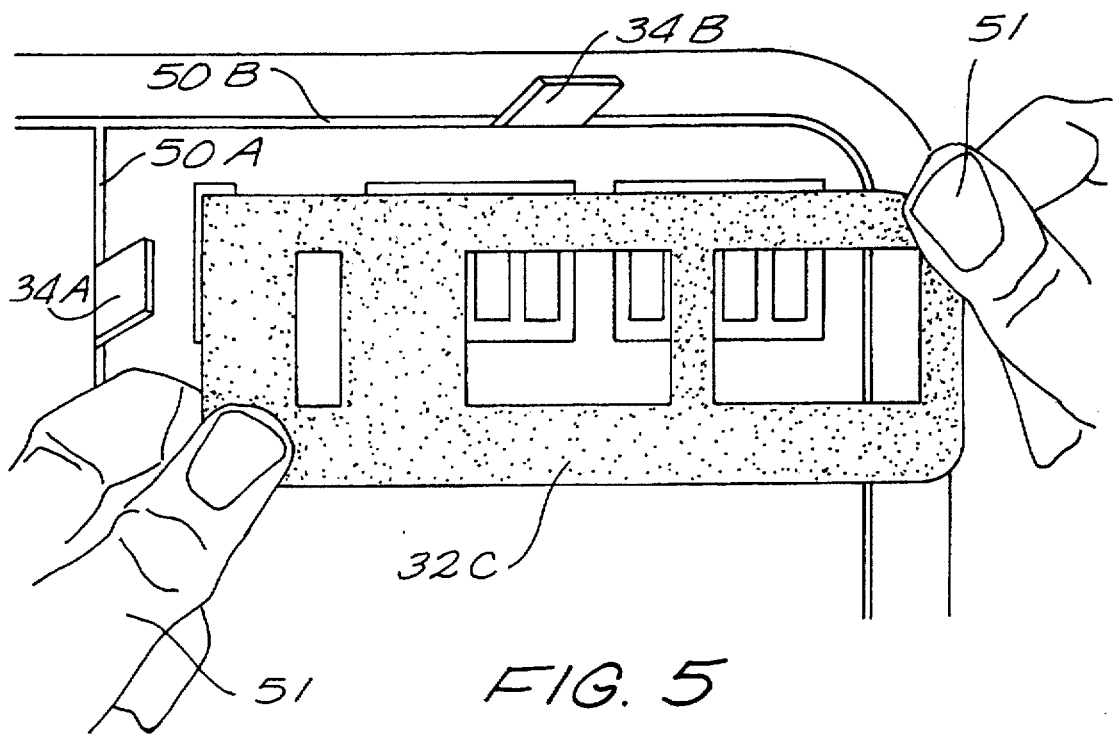
FIG. 5 is a perspective view of a leather panel being applied to the dashboard with the assist of positioning tabs.

FIG. 5 is a perspective view of a leather panel being applied to the dashboard with the assist of positioning tabs.

In this illustration, leather panel 32C is being manipulated by user 51 for placement onto the dash. Near the area of placement are slots or grooves 50A and 50B which are created during manufacture of the automobile and are typically the joints between dashboard components.

Prior to placement of the leather panel 32C, operator 51 places guides 34A and 34B into grooves 50A and 50B respectively. These guides 34A and 34B provide a squaring mechanism so that when leather panel 32C is placed, it is in proper alignment and position.

Figure 6A:
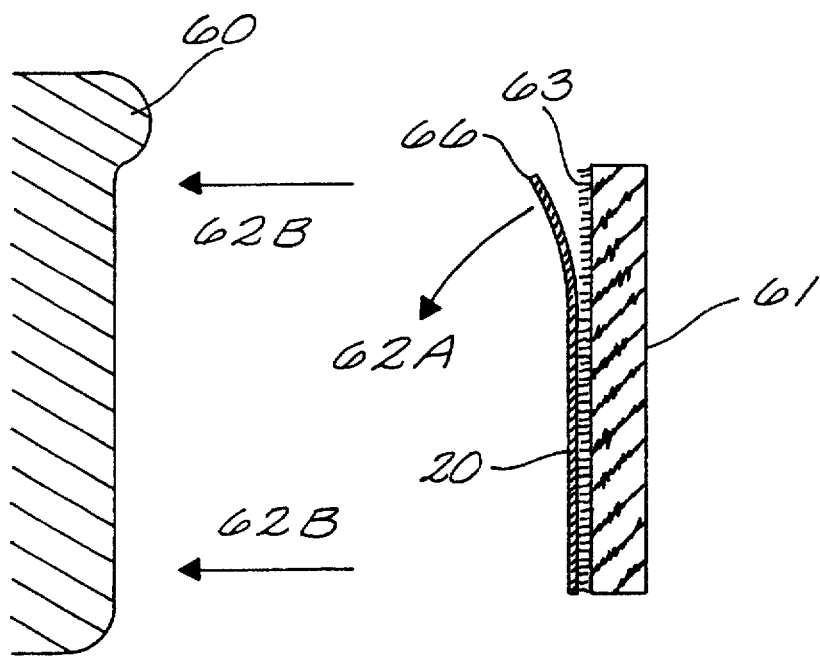
FIGS. 6A and 6B are views of a leather panel being applied to the dash using a heat activated adhesive.
Figure 6B:
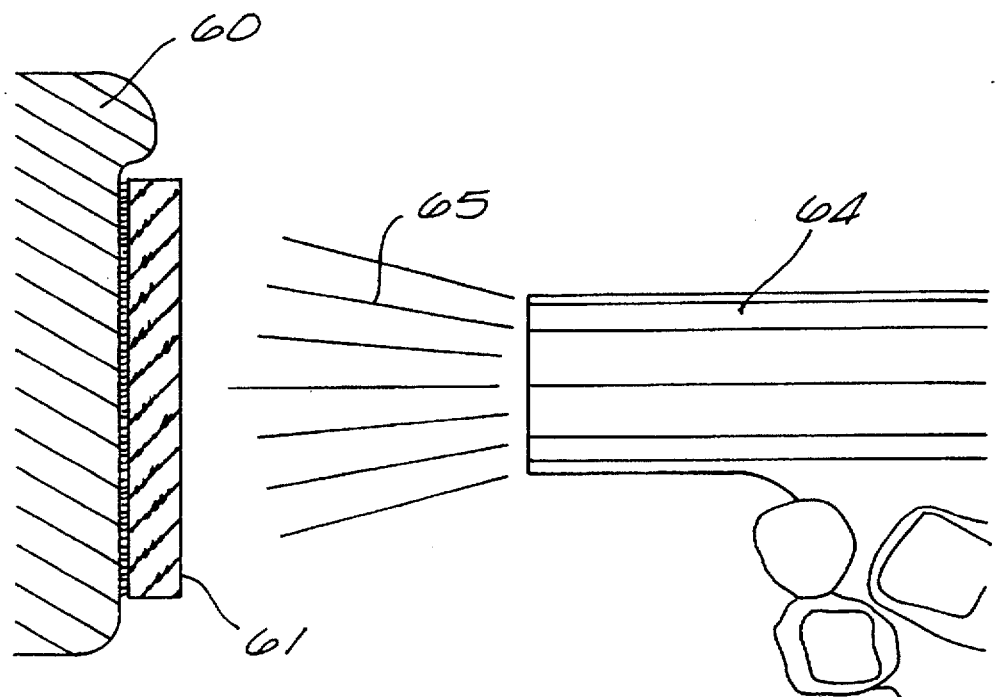

FIGS. 6A and 6B are views of a leather panel being applied to the dash using heat activated adhesive.

Covering tape 66 is pulled away from leather panel 61A as indicated by arrow 62A to expose heat activated adhesive 63. In this embodiment, droplets of pressure activated adhesive are also used with heat activated adhesive 63 so that when the leather panel is pressed against dash 60 as indicated by arrows 62B, leather panel 61 is secured.

Permanent bonding of leather panel 61 to dash 60 is accomplished by heating 65 the leather panel 61 with heater 64. This heating activates the heat activated adhesive 63 so that a permanent bond is accomplished.

This embodiment is particularly useful since the pressure adhesive is of such a slight amount, leather panel 61 is easily removed for adjustment prior to the permanent bonding.

It is clear that the present invention creates a highly improved accent panel for use with a variety of vehicles.

What is claimed is:

1. A leather panel comprising:
   a) a unit of pre-shrunk leather having a finished first surface and an unfinished second surface;
   b) a layer of adhesive applied to the second surface of said unit of leather; and,
   c) a covering tape having an adhesive on a first side thereof, the first side of said tape being secured to said layer of adhesive while said layer of adhesive is tacky.

2. The leather panel according to claim 1 wherein the adhesive on said covering tape is set by heat.

3. The leather panel according to claim 1 wherein said covering tape is selectively released from the adhesive on the first side thereof.

4. The leather panel according to claim 3 wherein said covering tape includes perforated sections, said perforated sections being substantially smaller than said tape.

5. The leather panel according to claim 3 wherein the adhesive applied to the first said of said covering tape includes a double sided tape having adhesive on both sides thereof.

6. A kit for application of leather accent panels to a vehicle, said kit comprising at least two leather panels, each of said leather panels being precut to a selected shape and being:
   a) a unit of leather having a finished first surface and an unfinished second surface;
   b) a layer of adhesive applied to the second surface of said unit of leather; and,
   c) a covering sheet having an adhesive on a first side thereof, the first side of said covering sheet being secured to said layer of adhesive while said layer of adhesive is tacky.

7. The kit according to claim 6 wherein the adhesive on said covering sheet is set by heat.

8. The kit according to claim 6 wherein said covering sheet is selectively released from the adhesive on the first side thereof leaving an exposed pressure sensitive adhesive.

9. The kit according to claim 8 wherein said covering sheet includes removable sections of tape being substantially smaller than said tape.

10. The kit according to claim 8 wherein the adhesive applied to the first said of said covering sheet includes a double sided tape having adhesive on both sides thereof.

11. The kit according to claim 6 further including a package, said package having multiple pockets, said at least two leather panels being stored in selected ones of said multiple pockets.

12. The kit according to claim 11 wherein said pockets are arranged to mimic a vehicle dashboard to identify locations on said vehicle dashboard for receipt of said at least two leather panels.

13. The kit according to claim 6 further including at least two guide members for insertion into openings in a vehicle dashboard for aligning said leather panels during application of said leather panels to said vehicle dashboard.

14. A kit for application of leather accent panels to a vehicle, said kit comprising:
   a) a package shaped to resemble a vehicle dash, said package having pockets at selected locations; and,
   b) leather accent panels being pre-cut to selected shapes and selectively attachable to the vehicle dash, each of said leather accent panels stored in a selected one of the pockets of said package.

15. The kit according to claim 14 wherein the leather panels are attachable via a heat set adhesive.

16. The kit according to claim 15 wherein each of said leather panels further includes:
   a) droplets of pressure activated adhesive applied at selected locations over said heat set adhesive; and,
   b) a releasable covering protecting said droplets of pressure activated adhesive.

17. The kit according to claim 14 wherein each of said leather accent panels includes:
   a) a unit of leather having a finished first surface and an unfinished second surface;
   b) a layer of adhesive applied to the second surface of said unit of leather; and,
   c) a covering having an adhesive on a first side thereof, the first side of said covering being secured to said layer of adhesive while said layer of adhesive is tacky.

18. The kit according to claim 17 wherein said covering is releasable from the adhesive on the first side thereof.

19. The kit according to claim 18 wherein said covering includes removable sections of covering, said removable sections of tape being substantially smaller than said covering.

20. The kit according to claim 18 wherein the adhesive applied to the first side of said covering includes a double sided tape having adhesive on both sides thereof.

21. The kit according to claim 14 further including at least two guide members for insertion into openings in a vehicle dashboard for aligning said leather panels during application to said vehicle dashboard.

22. The kit according to claim 14 wherein each of said pockets includes a unique hierarchial indicia and printed instructions for the application of the leather panel within the pocket to the vehicle dashboard.

* * * * *